(12) United States Patent
Tan et al.

(10) Patent No.: US 11,126,027 B2
(45) Date of Patent: Sep. 21, 2021

(54) DISPLAY APPARATUS AND DRIVING METHOD THEREOF

(71) Applicant: BOE Technology Group Co., Ltd., Beijing (CN)

(72) Inventors: Jifeng Tan, Beijing (CN); Wei Wang, Beijing (CN); Xiandong Meng, Beijing (CN); Xiaochuan Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 193 days.

(21) Appl. No.: 16/464,214

(22) PCT Filed: Jun. 14, 2018

(86) PCT No.: PCT/CN2018/091291
§ 371 (c)(1),
(2) Date: May 24, 2019

(87) PCT Pub. No.: WO2019/237306
PCT Pub. Date: Dec. 19, 2019

(65) Prior Publication Data
US 2021/0103182 A1 Apr. 8, 2021

(51) Int. Cl.
*G02F 1/1335* (2006.01)
*G02F 1/13357* (2006.01)
(Continued)

(52) U.S. Cl.
CPC .. *G02F 1/133512* (2013.01); *G02F 1/133603* (2013.01); *G02F 1/133605* (2013.01);
(Continued)

(58) Field of Classification Search
CPC .. G09G 3/3666; G09G 3/3607; G09G 3/3611; G09G 2300/023; G09G 1/134372;
(Continued)

(56) References Cited

U.S. PATENT DOCUMENTS

| | | |
|---|---|---|
| 4,952,036 A | 8/1990 | Gulick et al. |
| 2007/0242186 A1 | 10/2007 | Ikeno et al. |

(Continued)

FOREIGN PATENT DOCUMENTS

| | | |
|---|---|---|
| CN | 101059614 A | 10/2007 |
| CN | 103502881 A | 1/2014 |

(Continued)

OTHER PUBLICATIONS

International Search Report & Written Opinion dated Mar. 21, 2019, regarding PCT/CN2018/091291.

(Continued)

*Primary Examiner* — Charles S Chang
(74) *Attorney, Agent, or Firm* — Intellectual Valley Law, P.C.

(57) ABSTRACT

The present application provides a display apparatus. The display apparatus includes N numbers of display panels substantially parallel to each other and spaced apart from each other along a depth direction, N is a positive integer greater than 1. The N numbers of display panels are configured to display a composite image in a plurality of composite pixels. Each of the plurality of composite pixels is a composite pixel of N pixels respectively from the N numbers of display panels, the N pixels spaced apart from each other along the depth direction.

17 Claims, 12 Drawing Sheets

(51) Int. Cl.
*G02F 1/1343* (2006.01)
*G09G 3/36* (2006.01)

(52) U.S. Cl.
CPC ..... *G02F 1/134363* (2013.01); *G09G 3/3607* (2013.01); *G09G 3/3611* (2013.01); *G02F 1/134372* (2021.01); *G09G 2300/023* (2013.01)

(58) Field of Classification Search
CPC .......... G02F 1/13471; G02F 1/136286; G02F 1/133308; G02F 1/133514; G02F 1/134363; G02F 1/134372
USPC .................................................. 349/110–111
See application file for complete search history.

(56) References Cited

U.S. PATENT DOCUMENTS

| | | | |
|---|---|---|---|
| 2014/0049571 A1 | 2/2014 | Gopal et al. | |
| 2014/0285639 A1 | 9/2014 | Gyoung et al. | |
| 2016/0240118 A1* | 8/2016 | Ray | G09G 3/003 |
| 2017/0269373 A1* | 9/2017 | Kasahara | H04N 13/302 |
| 2019/0266970 A1* | 8/2019 | Newton | G02F 1/136286 |
| 2019/0285935 A1* | 9/2019 | Tan | G02F 1/133526 |

FOREIGN PATENT DOCUMENTS

| | | |
|---|---|---|
| CN | 103582903 A | 2/2014 |
| CN | 104024922 A | 9/2014 |
| CN | 104360515 A | 2/2015 |
| CN | 105007476 A | 10/2015 |
| CN | 107238974 A | 10/2017 |
| EP | 2535761 A2 | 12/2012 |
| JP | 2015197578 A | 11/2015 |
| JP | 2018087907 A | 6/2018 |
| WO | 2012169097 A1 | 12/2012 |

OTHER PUBLICATIONS

First Office Action in the Chinese Patent Application No. 2018800006714, dated Dec. 31, 2020; English translation attached.

* cited by examiner

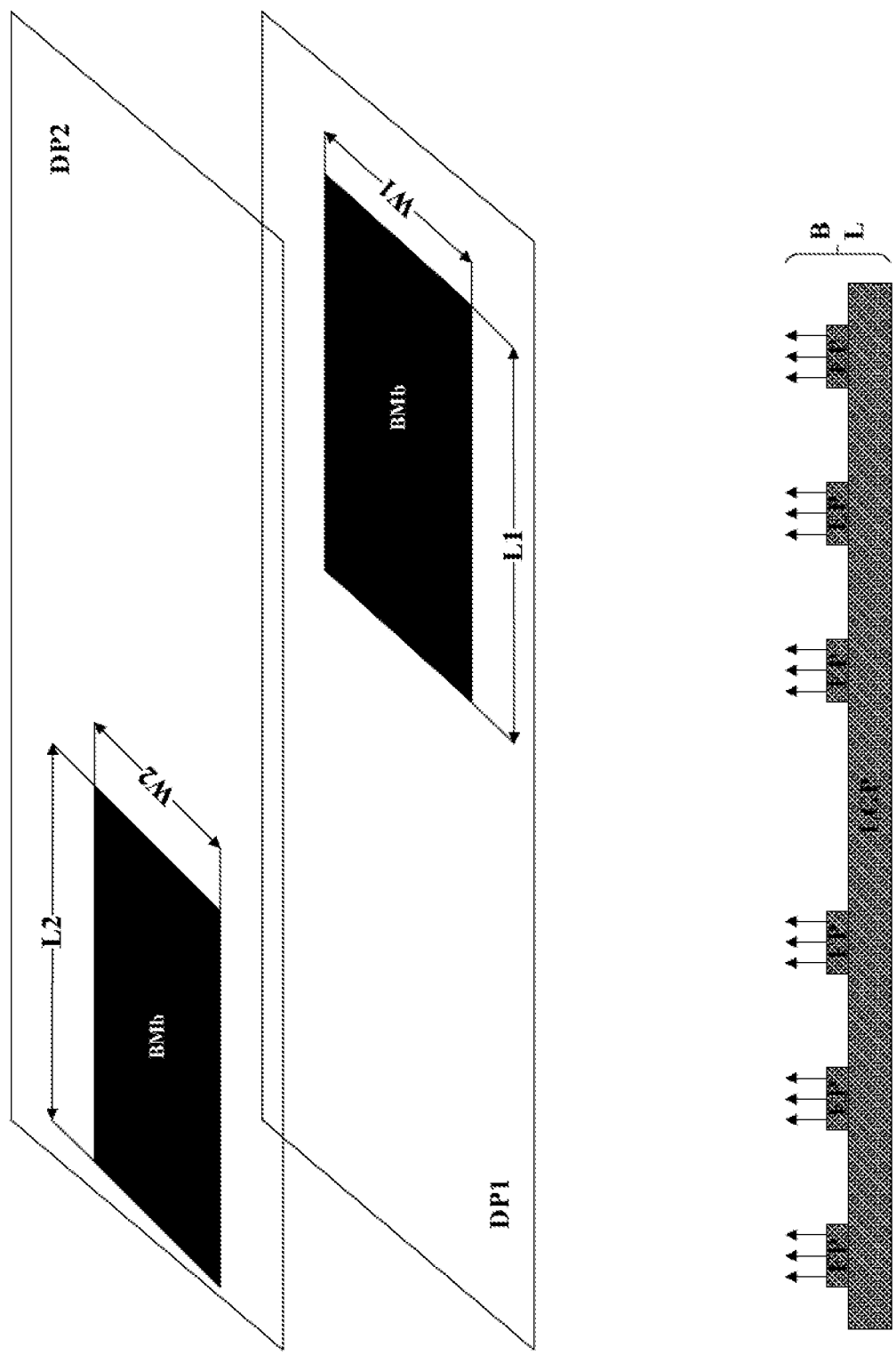

DISPLAY APPARATUS AND DRIVING METHOD THEREOF

CROSS-REFERENCE TO RELATED APPLICATION

This application is a national stage application under 35 U.S.C. § 371 of International Application No. PCT/CN2018/091291, filed Jun. 14, 2018, the contents of which are incorporated by reference in the entirety.

TECHNICAL FIELD

The present invention relates to display technology, more particularly, to a display apparatus and a method of driving a display apparatus.

BACKGROUND

Various three-dimensional display systems have been developed. Examples of three-dimensional display systems include a parallax barrier system, liquid crystal shutter glasses, polarized glasses, or the like. For displaying a three-dimensional image, typically an image for the left eye and an image for the right eye are displayed on a display panel. A viewer, using the three-dimensional display system such as a parallax barrier system, is able to view the image for the left eye by his/her left eye, and view the image for the right eye by his/her right eye, thereby perceiving a three-dimensional image.

SUMMARY

In one aspect, the present invention provides a display apparatus comprising N numbers of display panels substantially parallel to each other and spaced apart from each other along a depth direction, N is a positive integer greater than 1; wherein the N numbers of display panels are configured to display a composite image in a plurality of composite pixels; each of the plurality of composite pixels is a composite pixel of N pixels respectively from the N numbers of display panels, the N pixels spaced apart from each other along the depth direction.

Optionally, each of the N pixels respectively from the N numbers of display panels comprises a display part configured to display image and a non-display part where no image is displayed; and display parts of the N pixels respectively from the N numbers of display panels constitute the composite pixel.

Optionally, orthographic projections of the display parts of the N pixels respectively from the N numbers of display panels on a plane substantially parallel to each of the N numbers of display panels are substantially non-overlapping.

Optionally, each of the N numbers of display panels is a liquid crystal display panel including a black matrix comprising a plurality of black matrix blocks respectively in a plurality of pixels; and each individual one of the plurality of black matrix blocks is directly adjacent to a display part of a respective one of the plurality of pixels.

Optionally, each individual one of the plurality of black matrix blocks divides the display part of the respective one of the plurality of pixels into two sub-parts; and each individual one of the plurality of black matrix blocks is directly adjacent to the two sub-parts of the respective one of the plurality of pixels.

Optionally, the display apparatus further comprises a back light module for providing back light to the N numbers of display panels; wherein the back light module comprises a plurality of light emitting points configured to respectively emit light along a direction toward a plurality of subpixels respectively.

Optionally, each of the plurality of light emitting points is configured to emit light along a direction toward a respective one of the plurality of black matrix blocks directly adjacent to a respective one of the plurality of subpixels.

Optionally, the plurality of black matrix blocks in a second one of the N numbers of display panels have a width smaller than that of the plurality of black matrix blocks in a first one of the N numbers of display panels; wherein the second one of the N numbers of display panels is on a side of the first one of the N numbers of display panels distal to the back light module.

Optionally, the back light module comprises alight guide plate having an array of light guide dots on the light guide plate thereby forming the plurality of light emitting points.

Optionally, the back light module comprises one or more light sources, a light guide plate, and a reflective mirror configured to collimate light from the one or more light sources into substantially collimated light; wherein the light guide plate is configured to receive the substantially collimated light from one or more lateral sides of the light guide plate, and configured to transmit light to the plurality of subpixels respectively through the plurality of light emitting points respectively.

Optionally, the liquid crystal display panel is a fringe field driven liquid crystal display panel, in which a liquid crystal layer is driven by a fringe electric field.

Optionally, the liquid crystal display panel is one selected from a group consisting of an advanced super-dimensional switching liquid crystal display panel, an in-plane switch liquid crystal display panel, and a fringe field switching liquid crystal display panel.

Optionally, the liquid crystal display panel comprises a common electrode and a pixel electrode; wherein the common electrode comprises a plurality of common electrode branches spaced apart from each other; and the plurality of common electrode branches have a pitch less than 20 µm.

Optionally, the liquid crystal display panel comprises a common electrode and a pixel electrode; wherein the pixel electrode comprises a plurality of pixel electrode branches spaced apart from each other; and the plurality of pixel electrode branches have a pitch less than 20 µm.

Optionally, the N numbers of display panels are spaced apart from each other so that any two directly adjacent imaging planes of a plurality of imaging planes corresponding to the N numbers of display panels are spaced apart by a substantially same distance.

Optionally, the display apparatus further comprises a lens.

Optionally, the N numbers of display panels are spaced apart from each other so that any two directly adjacent virtual imaging planes of a plurality of virtual imaging planes corresponding to the N numbers of display panels are spaced apart by a substantially same distance.

Optionally, the display apparatus is free of any polarizer on two sides of the N numbers of display panels and between adjacent display panels of the N numbers of display panels.

Optionally, each of the N pixels respectively from the N numbers of display panels comprises a plurality of subpixels.

Optionally, 2≤N≤28.

Optionally, N=6.

In another aspect, the present invention provides a method of driving a display apparatus comprising N numbers of display panels substantially parallel to each other and spaced apart from each other along a depth direction, N is a positive integer greater than 1; wherein the N numbers of display panels are configured to display a composite image in a plurality of composite pixels; each of the plurality of composite pixels is a composite pixel of N pixels respectively from the N numbers of display panels, the N pixels spaced apart from each other along the depth direction; each of the N pixels respectively from the N numbers of display panels comprises a display part configured to display image and a non-display part where no image is displayed; display parts of the N pixels respectively from the N numbers of display panels constitute the composite pixel; each of the N numbers of display panels is a liquid crystal display panel including a black matrix comprising a plurality of black matrix blocks respectively in a plurality of pixels; each individual one of the plurality of black matrix blocks is directly adjacent to a display part of a respective one of the plurality of pixels; the method comprises illuminating light onto the plurality of black matrix blocks; and applying a fringe electric field to liquid crystal layers of the N numbers of display panels.

BRIEF DESCRIPTION OF THE FIGURES

The following drawings are merely examples for illustrative purposes according to various disclosed embodiments and are not intended to limit the scope of the present invention.

FIG. 9 illustrates a plurality of black matrix blocks in two display panels of the N numbers of display panels in a display apparatus in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In certain conventional display apparatus, multi-layers of liquid crystal display panels are stacked together to achieve three-dimensional image display. Because conventional liquid crystal display panels require an upper polarizer and a lower polarizer for each display panel to achieve grayscale in the plurality of subpixels, these conventional three-dimensional display apparatuses suffer from an extremely low light transmittance rate, especially as the numbers of display panels increase. Moreover, pixels of multiple liquid crystal display panels overlap along the light path, further reducing overall light transmittance rate in the display apparatus. When these conventional display apparatuses are used in virtual reality or augmented reality display, a satisfactory performance cannot be achieved if the numbers of stacked display panels are relatively small.

Accordingly, the present disclosure provides, inter alia, a display apparatus and a method of driving a display apparatus that substantially obviate one or more of the problems due to limitations and disadvantages of the related art. In one aspect, the present disclosure provides a display apparatus. In some embodiments, the display apparatus includes N numbers of display panels substantially parallel to each other and spaced apart from each other along a depth direction, N is a positive integer greater than 1. For example, the N numbers of display panels are stacked with each other along the depth direction. As used herein, the term "depth direction" refers to a direction substantially perpendicular extending from a first main surface to a second main surface of a display panel, the first main surface and the second main surface facing each other. As used herein, the term "substantially parallel" refers to a main surface of a first display panel and a main surface of a second display panel forming a dihedral angle between them, and the dihedral angle is in a range of 0 degree to approximately 15 degrees, e.g., 0 degree to approximately 1 degree, approximately 1 degree to approximately 2 degrees, approximately 2 degree to approximately 5 degrees, approximately 5 degree to approximately 10 degrees, and approximately 10 degree to approximately 15 degrees. Optionally, the N numbers of display panels are configured to display a composite image in a plurality of composite pixels. Optionally, each of the plurality of composite pixels is a composite pixel of N pixels respectively from the N numbers of display panels, the N pixels spaced apart from each other along the depth direction.

Figure 1:
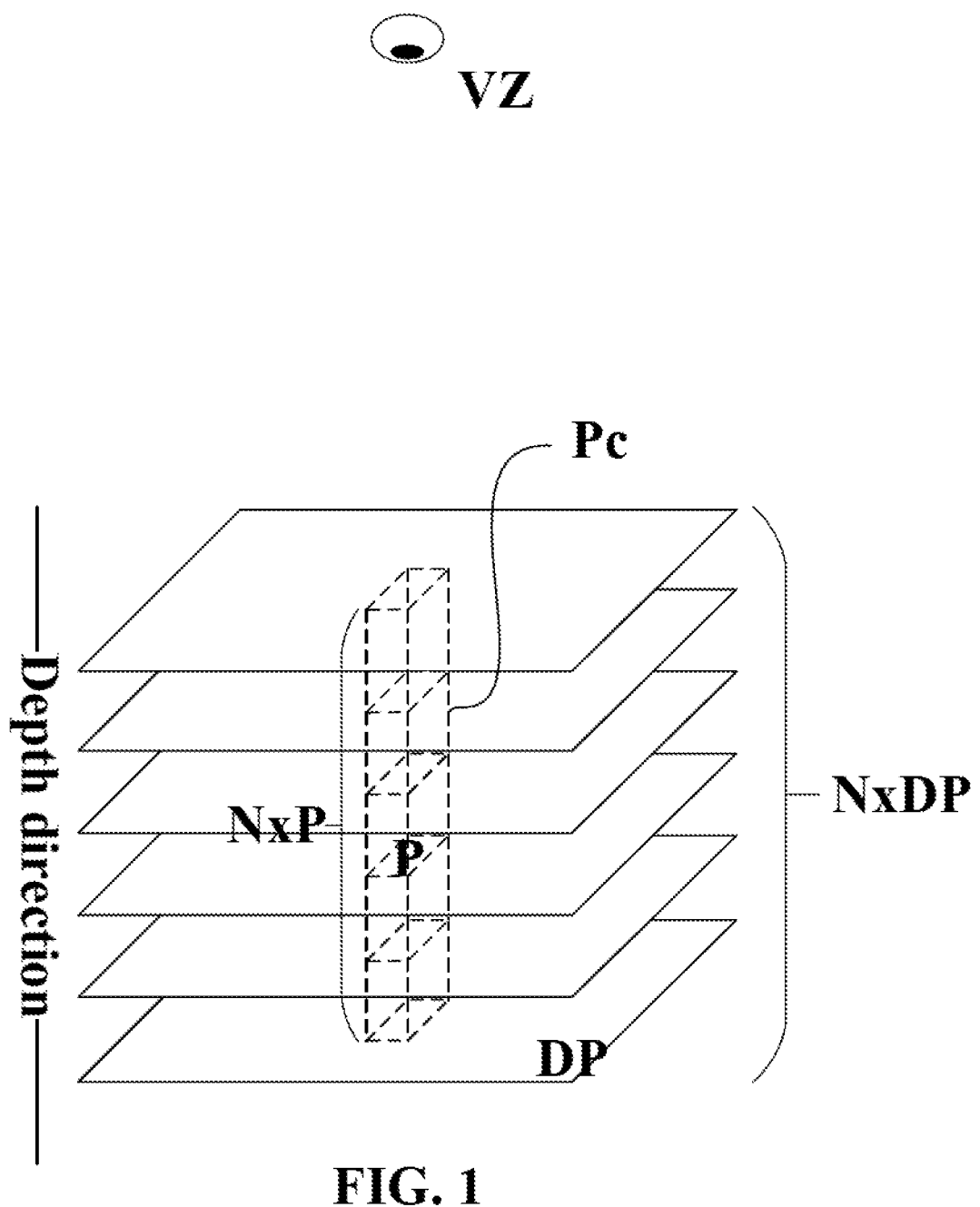
FIG. 1 is a schematic diagram illustrating a partial structure of a display apparatus in some embodiments according to the present disclosure.

FIG. 1 is a schematic diagram illustrating a partial structure of a display apparatus in some embodiments according to the present disclosure. Referring to FIG. 1, the display apparatus in some embodiments N numbers of display panels (N×DP) substantially parallel to each other and spaced apart from each other along a depth direction, N is a positive integer greater than 1 (e.g., N is 6 in FIG. 1). The N numbers of display panels are configured to display a composite image in a plurality of composite pixels Pc. One of the plurality of composite pixels Pc is shown in FIG. 1. As illustrated, each of the plurality of composite pixels Pc is a composite pixel of N pixels (N×P) respectively from the N numbers of display panels DP, the N pixels P spaced apart from each other along the depth direction. The display apparatus is configured to display a composite image to a view zone VZ (e.g., one or more human eyes). Optionally, the composite image is a three-dimensional image. Optionally, the display apparatus is a virtual reality display apparatus. Optionally, the display apparatus is an augmented reality display apparatus.

Figure 2:
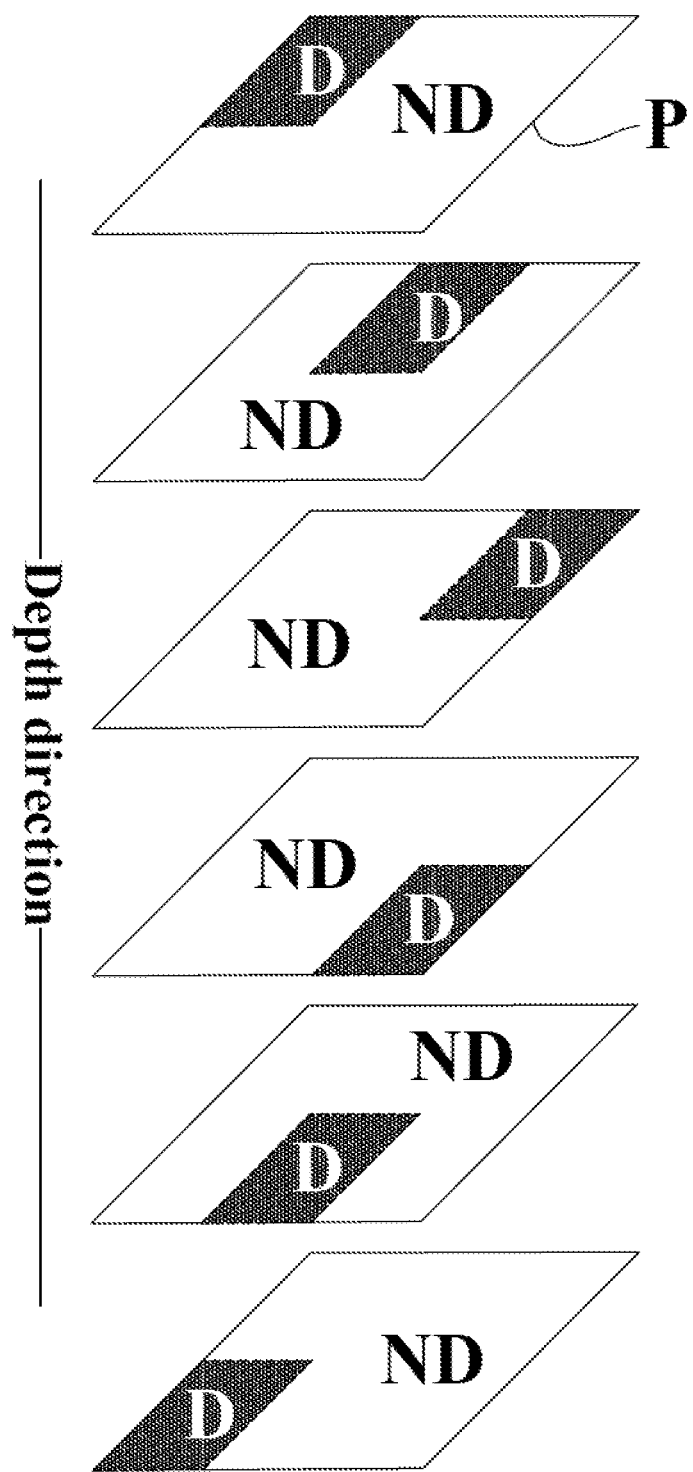
FIG. 2 is a zoom-in view of a composite pixel of a display apparatus in some embodiments according to the present disclosure.

FIG. 2 is a zoom-in view of a composite pixel of a display apparatus in some embodiments according to the present disclosure. Referring to FIG. 2, parts of six pixels P respectively from six display panels DP constitute a composite pixel. The six pixels P are substantially parallel to each other and spaced apart from each other along the depth direction. Each of the N pixels P respectively from the N numbers of display panels DP includes a display part D configured to display image and a non-display part ND where no image is displayed. Display parts D of the N pixels P respectively from the N numbers of display panels DP constitute the composite pixel. Optionally, the non-display part ND is substantially transparent. As used herein, the term "substantially transparent" means at least 50 percent (e.g., at least 60 percent, at least 70 percent, at least 80 percent, at least 90 percent, and at least 95 percent) of light in the visible wavelength range transmitted therethrough.

Figure 3:
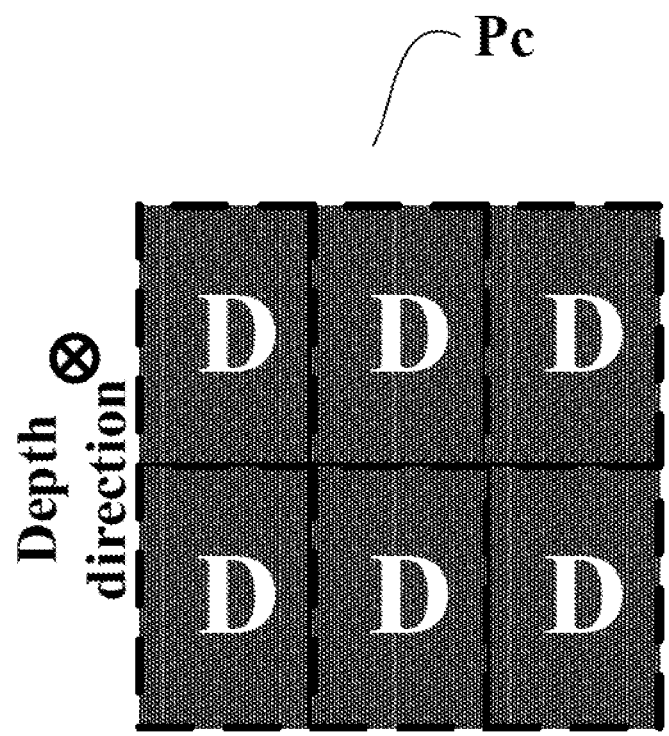
FIG. 3 is a plan view of a composite pixel of a display apparatus in some embodiments according to the present disclosure.

FIG. 3 is a plan view of a composite pixel of a display apparatus in some embodiments according to the present disclosure. Referring to FIG. 3, when viewed along the depth direction, display parts D of the N pixels respectively from the N numbers of display panels constitute the composite pixel Pc. Referring to FIG. 2 and FIG. 3, orthographic projections of the display parts D of the N pixels respectively from the N numbers of display panels on a plane substantially parallel to each of the N numbers of display panels (e.g., a plane containing any one of the N numbers of display panels) are substantially non-overlapping. As used herein, the term "substantially non-overlapping" refers to two orthographic projections being at least 50 percent (e.g., at least 60 percent, at least 70 percent, at least 80 percent, at least 90 percent, at least 95 percent, at least 99 percent, and 100 percent) non-overlapping.

Various appropriate display panels may be used in the present display apparatus. Optionally, the display panel is one that requires a back light. Optionally, the display panel is a self-emitting display panel. Examples of appropriate display panels include a liquid crystal display panel, an organic light emitting diode display panel, a micro-light emitting diode display panel, a liquid crystal on silicon display panel. Optionally, the liquid crystal display panel includes a color filter. Optionally, the liquid crystal display panel does not include a color filter, and the backlight for the liquid crystal display panel includes a plurality of light emitting elements of different colors, e.g., red, green, and blue.

Figure 4:
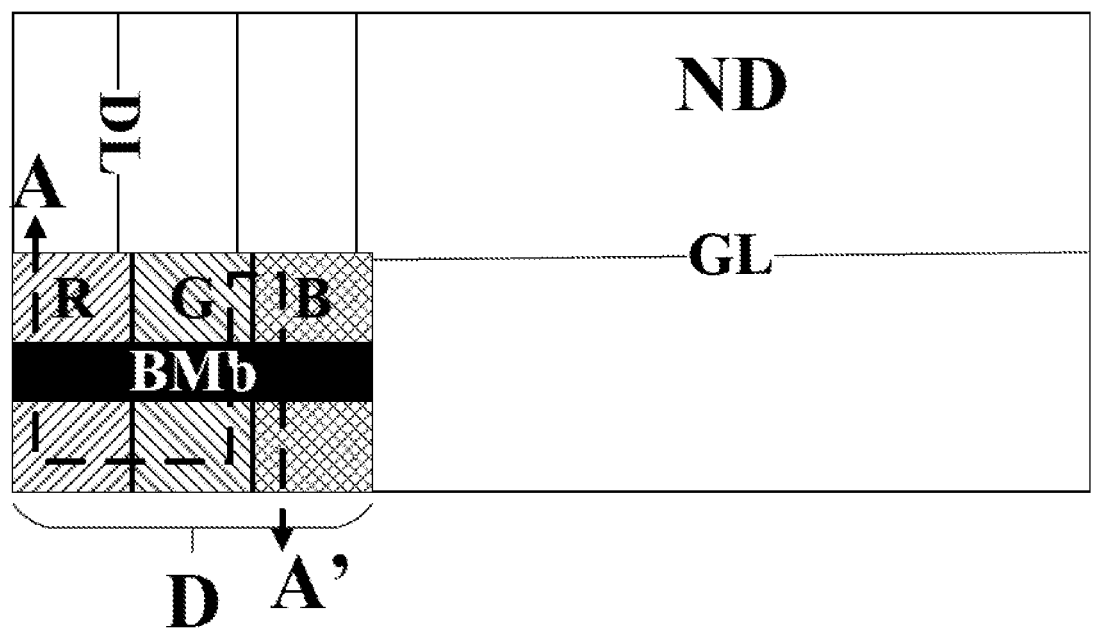
FIG. 4 is a partial cross-sectional view of a display apparatus in some embodiments according to the present disclosure.

In some embodiments, each of the N numbers of display panels further includes a black matrix including a plurality of black matrix blocks respectively in a plurality of pixels. Each individual one of the plurality of black matrix blocks is directly adjacent to a display part of a respective one of the plurality of pixels. FIG. 4 is a zoom-in view of a pixel in one of stacked display panels of a display apparatus in some embodiments according to the present disclosure. Referring to FIG. 4, a pixel in one of the N numbers of display panels is shown. The pixel includes a display part D and a non-display part ND directly adjacent to the display part D. The pixel in FIG. 4 is shown to include three subpixels (display parts of which corresponding to color filter blocks R, G, and B), a plurality of data lines DL, and one of a plurality of gate lines GL for driving the three subpixels. The pixel includes one of the plurality of black matrix blocks BMb directly adjacent to a display part D of the pixel. As shown in FIG. 4, each individual one of the plurality of black matrix blocks BMb divides the display part D of the respective one of the plurality of pixels into two sub-parts, each individual one of the plurality of black matrix blocks BMb is directly adjacent to the two sub-parts of the respective one of the plurality of pixels. Optionally, the pixel has a width approximately 3 times to approximately 5 times (e.g., approximately 4 times) of a width of the display part D. In one example, the display part D has a width of approximately 63.6 μm, and the pixel has a width of approximately 254 μm.

Figure 5:
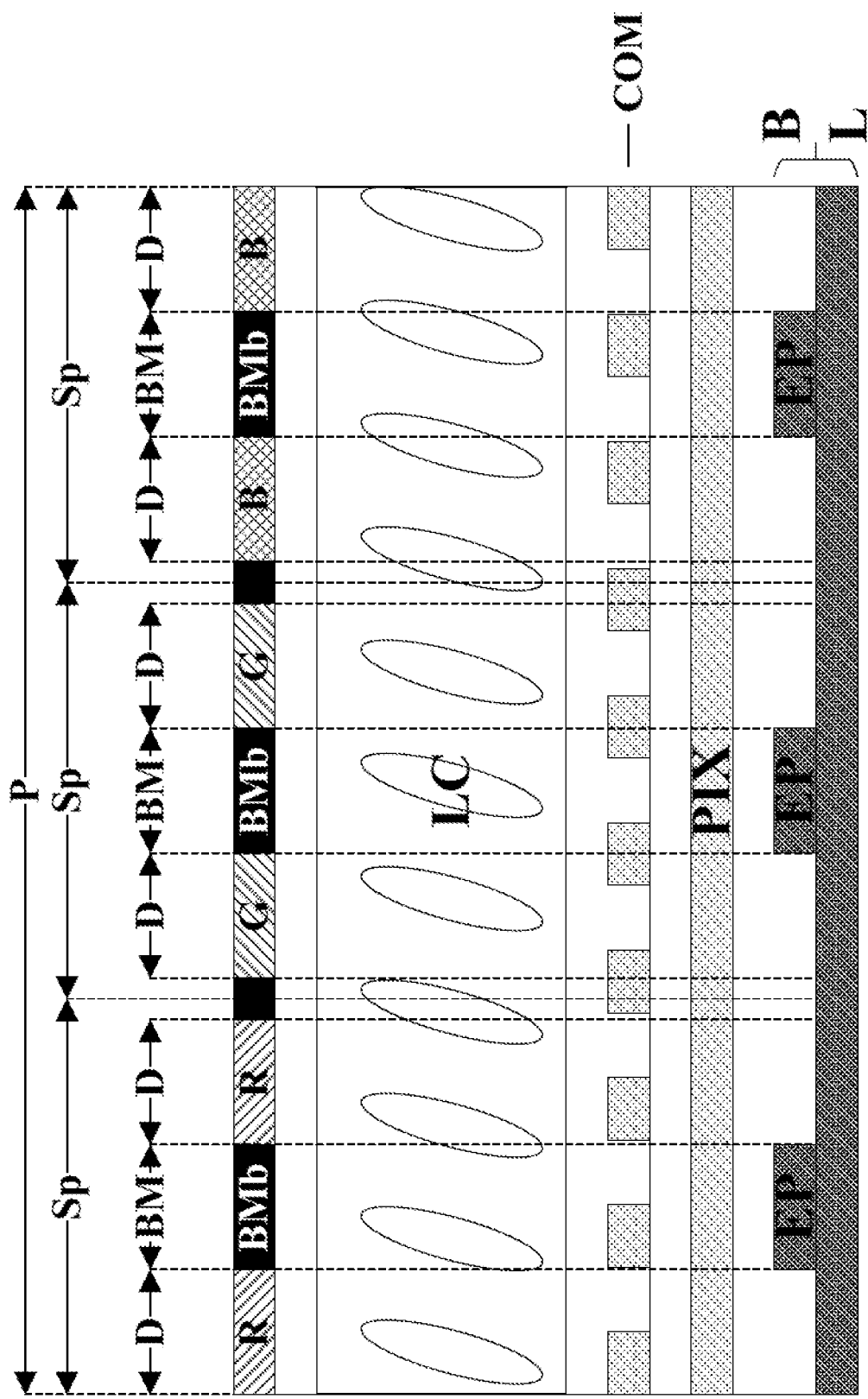
FIG. 5 is a partial cross-sectional view along A-A' line in FIG. 4.

In some embodiments, each of the N numbers of display panels is a liquid crystal display panel including a black matrix having a plurality of black matrix blocks respectively in a plurality of pixels. Each individual one of the plurality of black matrix blocks is directly adjacent to a display part of a respective one of the plurality of pixels. FIG. 5 is a partial cross-sectional view along A-A' line in FIG. 4. Referring to FIG. 5, the display panel is a liquid crystal display panel having a plurality of pixels P. The display panel includes a black matrix BM including a plurality of black matrix blocks BMb respectively in a plurality of pixels P. Each of the plurality of pixels P includes a plurality of subpixels Sp. Each of the plurality of subpixels Sp includes a portion of a display part D and at least a portion of one of the plurality of black matrix blocks BMb. Each individual one of the plurality of black matrix blocks BMb is directly adjacent to a display part D of a respective one of the plurality of pixels P. In one example, and as shown in FIG. 4 and FIG. 5, each individual one of the plurality of black matrix blocks BMb divides the display part D of the respective one of the plurality of pixels P into two sub-parts. Each individual one of the plurality of black matrix blocks BMb is directly adjacent to the two sub-parts of the respective one of the plurality of pixels P. Further, as shown in FIG. 4 and FIG. 5, each individual one of the plurality of black matrix blocks BMb divides the display part D of each of the plurality of subpixels Sp into two sub-parts, and each individual one of the plurality of black matrix blocks BMb is directly adjacent to the two sub-parts of each of the plurality of subpixels Sp.

The liquid crystal display panel in FIG. 5 further includes a liquid crystal layer LC between two opposite substrates, a pixel electrode PIX and a common electrode COM for driving the liquid crystal layer LC. In some embodiments, the liquid crystal display panel is a fringe field driven liquid crystal display panel, in which the liquid crystal layer is driven by a fringe electric field. Examples of fringe field driven liquid crystal display panel include, but are not limited to, an advanced super-dimensional switching (ADS) liquid crystal display panel, an in-plane switch (IPS) liquid crystal display panel, and a fringe field switching (FFS) liquid crystal display panel. For color display, optionally the liquid crystal display panel further includes a color filter including a plurality of color filter blocks (e.g., color filter blocks R, G, and B).

Referring to FIG. 5, the display apparatus further includes a black light module BL for providing back light to the N numbers of display panels DP. The back light module BL includes a plurality of light emitting points EP configured to respectively emit light along a direction toward a plurality of subpixels Sp, respectively. In some embodiments, each of the plurality of light emitting points EP is configured to emit light along a direction toward a respective one of the black matrix blocks BMb directly adjacent to a respective one of the plurality of subpixels Sp.

Figure 6:
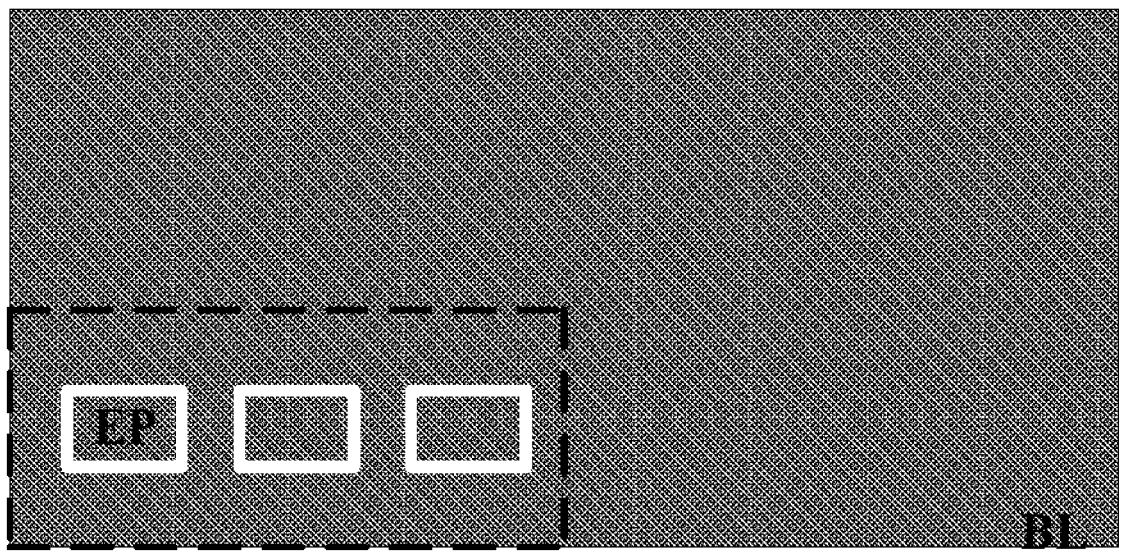
FIG. 6 is a plan view of a black light module in some embodiments according to the present disclosure.

FIG. 6 is a plan view of a black light module in some embodiments according to the present disclosure. Referring to FIG. 6, the back light module BL in some embodiments includes an array of a plurality of light emitting points EP. FIG. 6 shown a portion of the back light module BL corresponding to one of the plurality of pixels in a display panel. The area circled by dotted lines corresponds to a display part of one of the plurality of pixels in the display panel.

Figure 7:
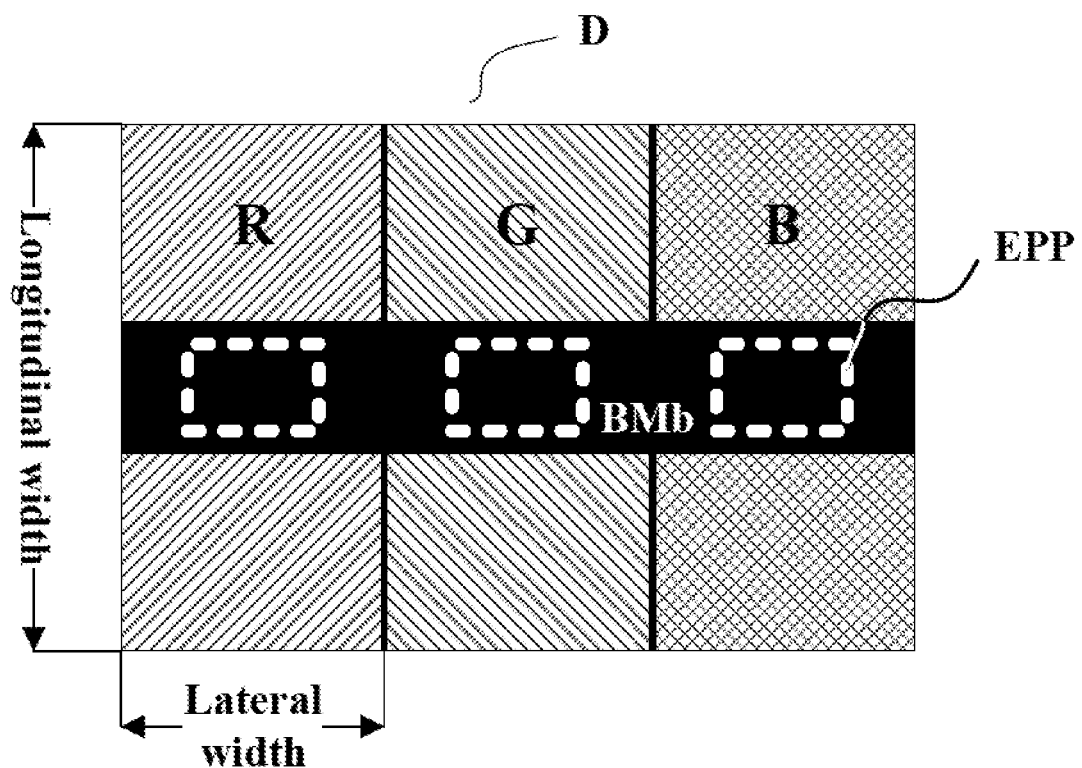
FIG. 7 illustrates orthographic projections of a plurality of light emitting points on a plurality of subpixels in some embodiments according to the present disclosure.

FIG. 7 illustrates orthographic projections of a plurality of light emitting points on a plurality of subpixels in some embodiments according to the present disclosure. FIG. 7 shows a display part D of one of the plurality of pixels in the display panel (corresponding to the area circled by dotted lines in FIG. 6). Orthographic projections EPP of a plurality of light emitting points on one of the plurality of black matrix blocks BMb are illustrated in white dotted lines. As shown in FIG. 7, because each of the plurality of light emitting points is configured to emit light along a direction toward a respective one of the black matrix blocks BMb directly adjacent to a respective one of the plurality of subpixels, orthographic projections EPP of the plurality of light emitting points on one of the plurality of black matrix blocks BMb are covered by the one of the plurality of black matrix blocks BMb.

In some embodiments, each individual one of the plurality of black matrix blocks BMb crosses over a plurality of subpixels in a respective one of the plurality of pixels along a direction of a lateral width of one of the plurality of subpixels, as shown in FIG. 7. Each individual one of plurality of subpixels is divided into two sub-parts along a direction of a longitudinal width of one of the plurality of subpixels, by one of the plurality of black matrix blocks BMb, as shown in FIG. 7.

Optionally, the plurality of light emitting points EP are a plurality of light guide points (e.g., light guide patterns of the light guide plate, a plurality of light guide dots on the light guide plate) on a light guide plate.

Figure 8:
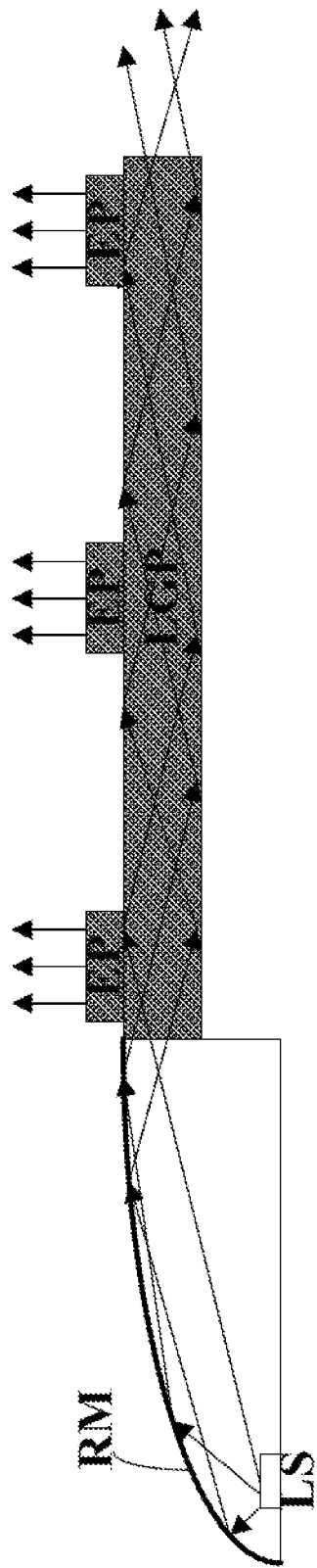
FIG. 8 is a schematic diagram illustrating the structure of a back light module in some embodiments according to the present disclosure.

FIG. 8 is a schematic diagram illustrating the structure of a back light module in some embodiments according to the present disclosure. Referring to FIG. 8, the back light module includes one or more light sources LS, a reflective mirror RM, and a light guide plate LGP having a plurality of light emitting points EP (e.g., a plurality of light guide dots). Various appropriate light sources may be used in the back light module. Examples of appropriate light sources include micro-light emitting diode (micro-LED) chips, quantum-dots light emitting diode (QD LED) light source, and an organic light emitting diode (OLED) light source. Optionally, the one or more light sources LS emit a white light. Optionally, the one or more light sources LS emit a light having a relatively narrow spectrum. Optionally, the one or more light sources LS includes one or more red light sources, one or more green light sources, and one or more blue light sources, and the one or more light sources LS emit a compound light of red light, green light and blue light. The reflective mirror RM is configured to collimate light from the one or more light sources LS into substantially collimated light. Referring to FIG. 8, the light guide plate LGP in some embodiments is configured to receive the substantially collimated light from one or more lateral sides of the light guide plate LGP, and configured to transmit light into the plurality of subpixels respectively through the plurality of light emitting points EP respectively. Optionally, the light guide plate LGP in some embodiments is configured to receive the substantially collimated light from one or more lateral sides of the light guide plate LGP, and configured to transmit light toward a respective one of the black matrix blocks directly adjacent to a respective one of the plurality of subpixels. The reflective mirror RM can have various appropriate shapes. Optionally, the reflective mirror RM is a curved mirror. Optionally, the substantially collimated light entering into the one or more lateral sides of the light guide plate LGP has an average angle of incidence equal to or greater than 80 degrees.

FIG. 9 illustrates a plurality of black matrix blocks in two display panels of the N numbers of display panels in a display apparatus in some embodiments according to the present disclosure. Referring to FIG. 9, the N numbers of display panels includes a first display panel DP1 and a second display panel DP2. The plurality of black matrix blocks BMb in the first display panel DP1 of the N numbers of display panels have a width W1. The plurality of black matrix blocks BMb in the second display panel DP2 of the N numbers of display panels have a width W2. The second display panel DP2 of the N numbers of display panels is on a side of the first display panel DP1 of the N numbers of display panels distal to the back light module BL. Optionally, W2 is smaller than W1. Light emitted from each of the plurality of light emitting points EP has an angle of divergence. By having W2 smaller than W1, light intensity received by the subpixels respectively in the N numbers of display panels can be made to be close to each other. Referring to FIG. 7 and FIG. 9, the width W1 and the width W2 are respectively widths of the plurality of black matrix blocks BMb along a longitudinal width direction of one of the plurality of subpixels.

In some embodiments, the plurality of black matrix blocks BMb in the first display panel DP1 of the N numbers of display panels have a length L1, and the plurality of black matrix blocks BMb in the second display panel DP2 of the N numbers of display panels have a length L2. Optionally, L1 is substantially the same as L2. As used herein, the term "substantially the same" refers to a difference between two values not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%. Optionally, each of the length L1 and the length L2 is equal to a width of a display part of one of the plurality of pixels in a display panel, e.g., a sum of a lateral widths of three subpixels in the one of the plurality of pixels. Referring to FIG. 7 and FIG. 9, the length L1 and the length L2 are respectively lengths of the plurality of black matrix blocks BMb along a lateral width direction of one of the plurality of subpixels. Optionally, each of the length L1 and the length L2 is approximately 63.6 μm.

Figure 10A:
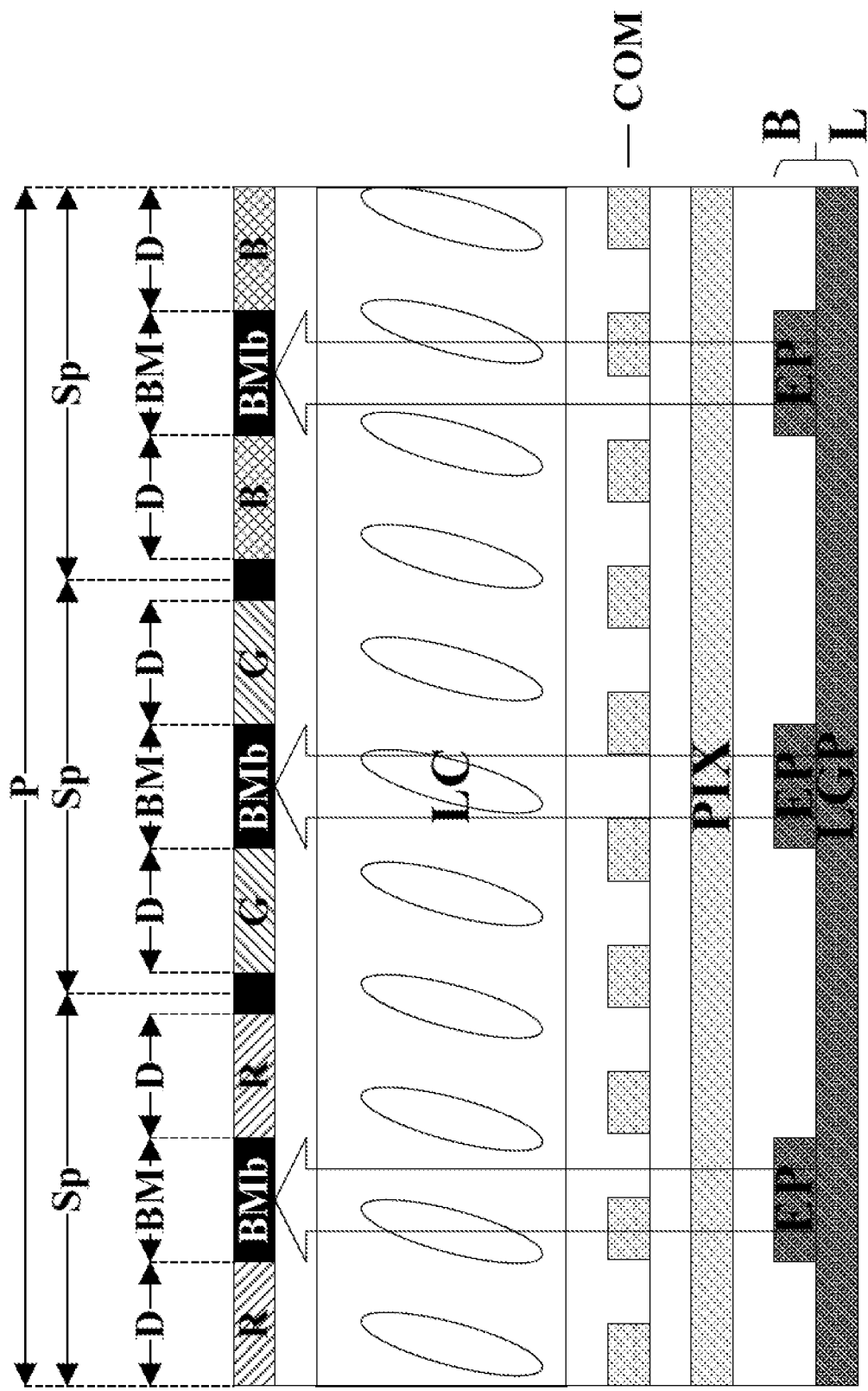
FIG. 10A illustrates light transmission path in a dark state of a display panel in some embodiments according to the present disclosure.

FIG. 10A illustrates light transmission path in a dark state of a display panel in some embodiments according to the present disclosure. Referring to FIG. 10A, when the display panel is in the dark state, the liquid crystal layer LC is not applied with an electric field, e.g., data signals are not provided to the pixel electrodes PIX. In the dark state, light emitted from each of the plurality of light emitting points EP is directed to one of the plurality of black matrix blocks BMb, and is blocked by the one of the plurality of black matrix blocks BMb. No image is displayed in the display panel.

Figure 10B:
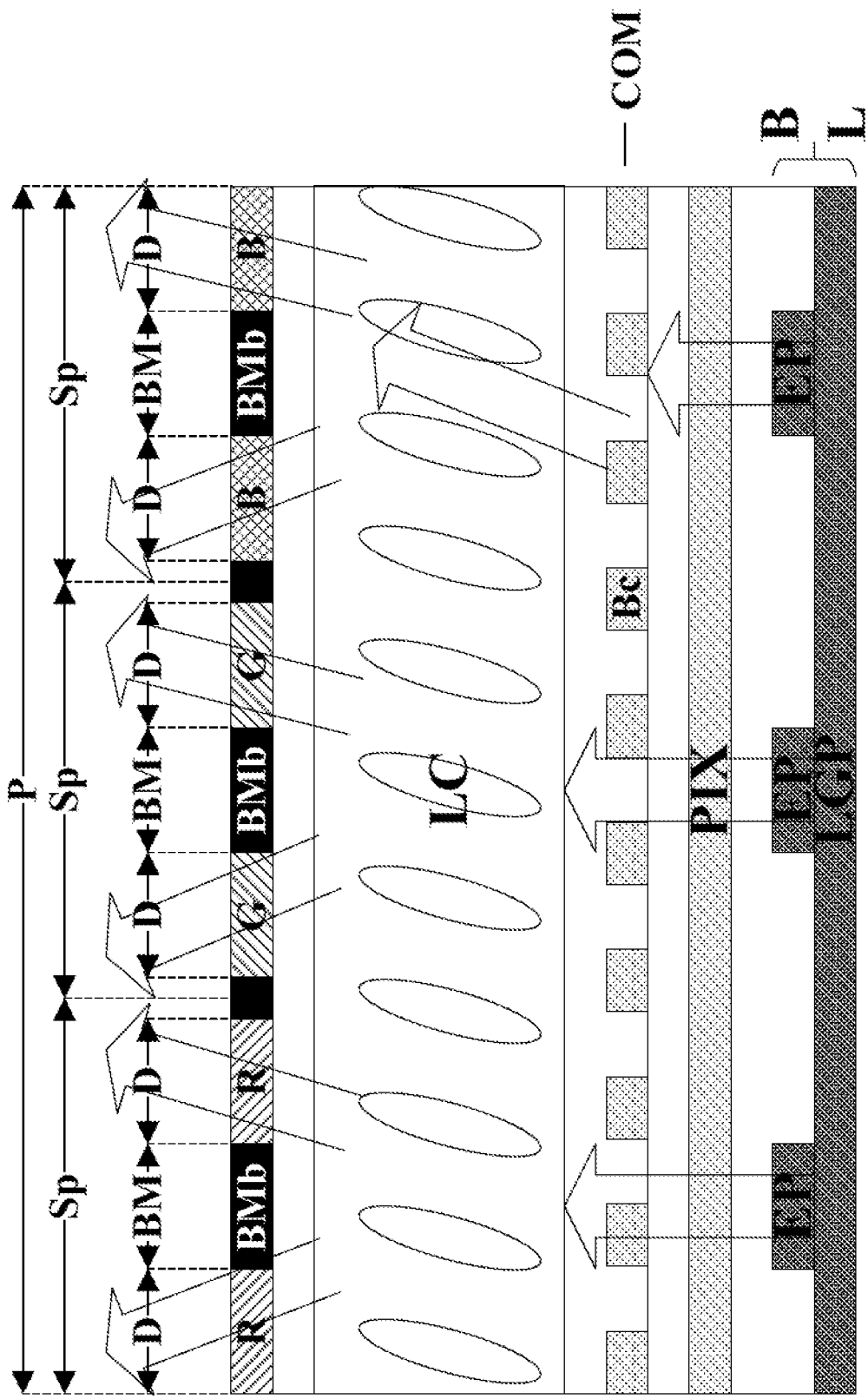
FIG. 10B illustrates light transmission path in a bright state of a display panel in some embodiments according to the present disclosure.

FIG. 10B illustrates light transmission path in a bright state of a display panel in some embodiments according to the present disclosure. Referring to FIG. 10B, when the display panel is in the bright state, data signals are provided to the pixel electrodes PX, and an electric field (e.g., a fringe electric field) is applied to the liquid crystal layer LC. Upon application of the electric field (e.g., the fringe electric field), the liquid crystal layer functions substantially equivalent to a plurality of liquid crystal lenses having a very small pitch. Because the functionally equivalent plurality of liquid crystal lenses have a very small pitch, the liquid crystal layer LC (e.g., the functionally equivalent plurality of liquid crystal lenses) diffracts the incident light transmitted from the plurality of light emitting points EP respectively toward the plurality of black matrix blocks BMb. The diffracted light, as shown in FIG. 10B, transmits through the display panel from the display part D of the display panel, thereby achieving image display. Because data signals applied to different subpixels are different, the intensity of the diffract light in each of the plurality of subpixels are also different, images of different grayscales respectively in the plurality of subpixels can be realized.

As shown in FIG. OB, the common electrode COM includes a plurality of common electrode branches Bc spaced apart from each other. A fringe field is formed between each individual branch of the plurality of common electrode branches Bc and the pixel electrode PIX on each side of each individual branch. Accordingly, each individual branch of the plurality of common electrode branches Bc generates two liquid crystal lenses. A pitch of the plurality of common electrode branches Bc is approximately twice of a pitch of the plurality of liquid crystal lenses formed. In some embodiments, the pitch of the plurality of liquid crystal lenses is less than 10 µm, e.g., less than 8 µm, less than 6 µm, less than 4 µm, and less than 2 µm. In some embodiments, the pitch of the plurality of common electrode branches Bc is less than 20 µm, e.g., less than 18 µm, less than 16 µm, less than 14 µm, less than 12 µm, less than 10 µm, less than 8 µm, less than 6 µm, less than 4 µm, and less than 2 µm.

Figure 10C:
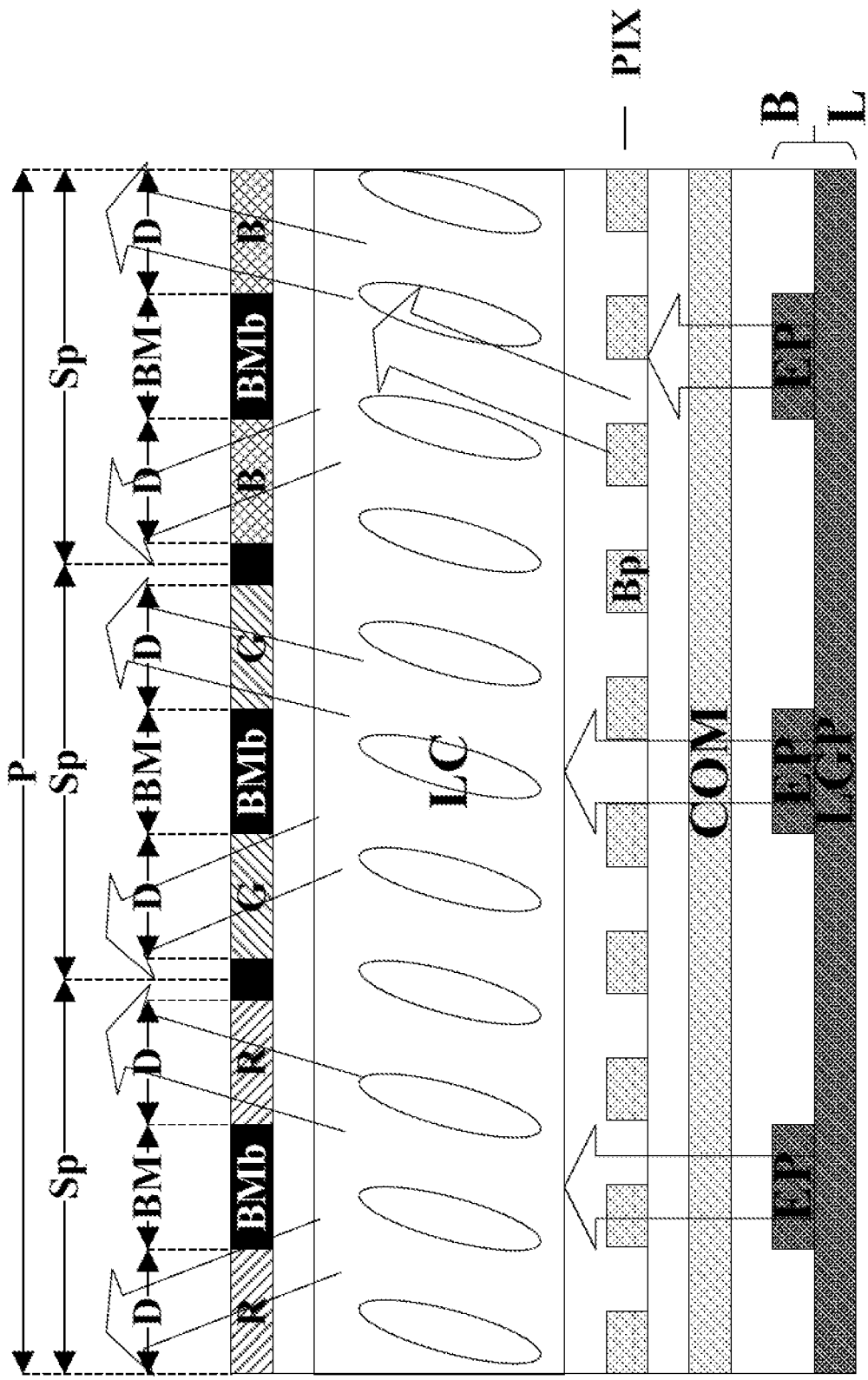
FIG. 10C illustrates light transmission path in a bright state of a display panel in some embodiments according to the present disclosure.

FIG. 10C illustrates light transmission path in a bright state of a display panel in some embodiments according to the present disclosure. In some embodiments, the pixel electrode PIX includes a plurality of pixel electrode branches Bp spaced apart from each other. A fringe field is formed between each individual branch of the plurality of pixel electrode branches Bp and the common electrode COM on each side of each individual branch. Accordingly, each individual branch of the plurality of pixel electrode branches Bp generates two liquid crystal lenses. A pitch of the plurality of pixel electrode branches Bp is approximately twice of a pitch of the plurality of liquid crystal lenses formed. In some embodiments, the pitch of the plurality of liquid crystal lenses is less than 10 µm, e.g., less than 8 µm, less than 6 µm, less than 4 µm, and less than 2 µm. In some embodiments, the pitch of the plurality of pixel electrode branches Bp is less than 20 µm, e.g., less than 18 µm, less than 16 µm, less than 14 µm, less than 12 µm, less than 10 µm, less than 8 µm, less than 6 µm, less than 4 µm, and less than 2 µm.

Accordingly, the present disclosure provides a display apparatus free of any polarizer on two sides of the N numbers of display panels and between adjacent display panels of the N numbers of display panels. Due to the absence of any polarizer in the display apparatus, light transmittance rate through the present display apparatus is significantly improved. Particularly, considering the present display apparatus includes N numbers of display panels, the light intensity loss becomes more and more severe as N increases. On the other hand, as N increase, a more and more realistic three-dimensional images with sufficient depth information can be produced as an increasing numbers of imaging planes with different depths can be generated. The present display apparatus allows a relatively large number of display panels stacked together to produce three-dimensional images without loss of light intensity. Optionally, the display apparatus includes 2 to 28, or more, display panels stacked together, e.g., substantially parallel to each other and spaced apart from each other along the depth direction. Optionally, the display apparatus includes 6 display panels stacked together.

Figure 11:
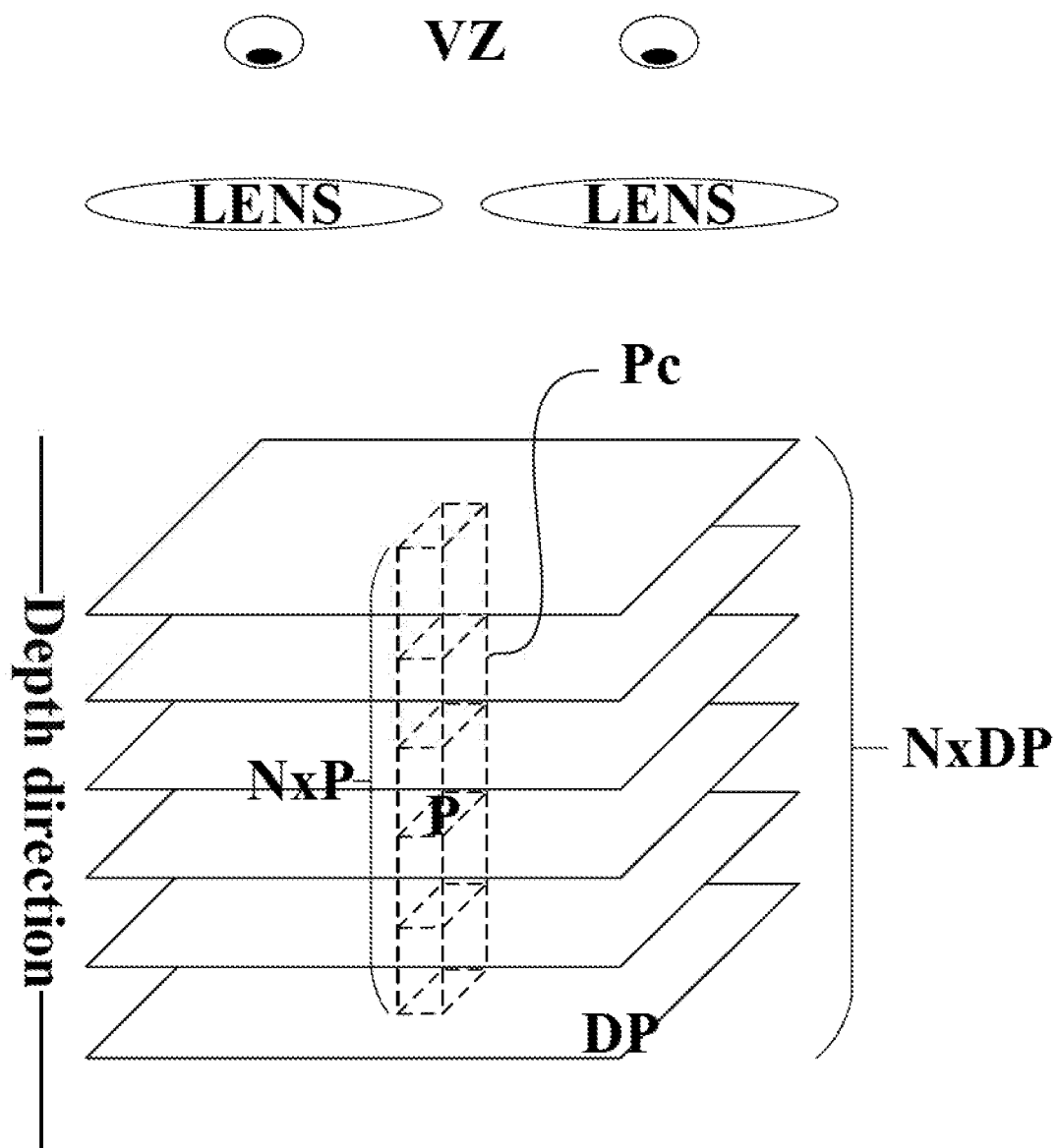
FIG. 11 is a schematic diagram illustrating a partial structure of a display apparatus in some embodiments according to the present disclosure.

FIG. 11 is a schematic diagram illustrating a partial structure of a display apparatus in some embodiments according to the present disclosure. Referring to FIG. 11, the display apparatus in some embodiments further includes a lens LENS along the depth direction of the N numbers of display panels DP. By having a lens LENS between the view zone VZ (human eyes) and the N numbers of display panels DP, the images can be magnified and a range of depth of field can be increased.

Optionally, the N numbers of display panels are spaced apart from each other so that any two directly adjacent imaging planes of a plurality of imaging planes corresponding to the N numbers of display panels are spaced apart by a substantially same distance. As used herein, the term "substantially same distance" refers to a difference between two distances not exceeding 10%, e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%.

Optionally, the display apparatus does not include a lens between the view zone and the N numbers of display panels. Optionally, the depth of field is the same as distance between the view zone and the display panel. Optionally, the plurality of imaging planes are planes of the N numbers of display panels. Optionally, the planes of the N numbers of display panels are spaced apart by a substantially same distance.

Figure 12:
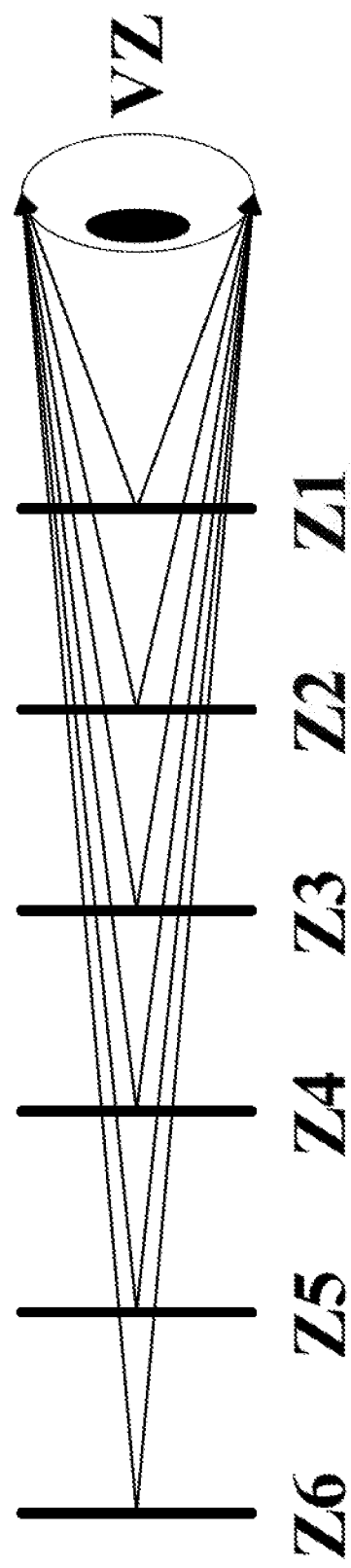
FIG. 12 illustrates a plurality of virtual imaging planes corresponding to the N numbers of display panels in some embodiments according to the present disclosure.

Optionally, and referring to FIG. 11, the display apparatus includes a lens LENS between the view zone VZ (human eyes) and the N numbers of display panels DP. The plurality of imaging planes are a plurality of virtual imaging planes corresponding to the N numbers of display panels. FIG. 12 illustrates a plurality of virtual imaging planes corresponding to the N numbers of display panels in some embodiments according to the present disclosure. Referring to FIG. 12, in some embodiments, the N numbers of display panels (e.g., six display panels) are configured to generate a plurality of virtual imaging planes corresponding to the N numbers of display panels. As shown in FIG. 12, the plurality of virtual imaging planes Z1, Z2, Z3, Z4, Z5, and Z6 respectively correspond to the N numbers of display panels (e.g., six display panels). Optionally, the N numbers of display panels are spaced apart from each other so that any two directly adjacent virtual imaging planes of a plurality of virtual imaging planes corresponding to the N numbers of display panels are spaced apart by a substantially same distance, e.g., distances between any two directly adjacent virtual imaging planes Z1-Z6 are substantially same.

In one example, a distance between the virtual imaging plane Z1 and the view zone VZ is set to be a normal reading distance of human eye, e.g., approximately 25 cm. In another example, a distance between the view zone VZ and the virtual imaging plane Z6 is set to be a far sight distance of a human eye. e.g., 3 m to 5 m. Optionally, the distance between the view zone VZ and the virtual imaging plane Z6 is set to be 3 m. Accordingly, the distance between any two directly adjacent virtual imaging planes Z1-Z6 can be determined to be approximately 95 cm.

The spacing distances between any two directly adjacent display panels of the N numbers of display panels can then be calculated according to Equation (1):

$$1/a + 1/b = 1/f \qquad (1);$$

wherein a is a distance between a lens and a display panel, b is a distance between a virtual imaging plane to the lens, and f is a focal distance of the lens. Accordingly, once b is determined, a can be calculated based on Equation (1).

In some embodiments, the display apparatus further includes N numbers of driving circuits respectively configured to drive image display in the N numbers of display panels. Optionally, each of the N numbers of display panels is independently driven by a respective one of the N numbers of driving circuits. Various implementations of three-dimensional image display can be practiced using the present display apparatus. In one example, foreground images, middle ground images, and background images can be respectively displayed in the N numbers of display panels. For example, the foreground images are displayed in one or more display panels more proximal to the view zone, the background images are displayed in one or more display panels more distal to the view zone, and the middle ground images are displayed in one or more display panels in the middle of the stack. By having this design, different focus cues can be achieved in the three-dimensional images.

In another aspect, the present disclosure provides a method of driving a display apparatus described herein. In some embodiments, the display apparatus includes N numbers of display panels substantially parallel to each other and spaced apart from each other along a depth direction, N is a positive integer greater than 1. Optionally, the N numbers of display panels are configured to display a composite image in a plurality of composite pixels. Optionally, each of the plurality of composite pixels is a composite pixel of N pixels respectively from the N numbers of display panels, the N pixels spaced apart from each other along the depth direction. Optionally, each of the N pixels respectively from the N numbers of display panels includes a display part configured to display image and a non-display part where no image is displayed. Optionally, display parts of the N pixels respectively from the N numbers of display panels constitute the composite pixel. Optionally, each of the N numbers of display panels is a liquid crystal display panel including a black matrix having a plurality of black matrix blocks respectively in a plurality of pixels. Optionally, each individual one of the plurality of black matrix blocks is directly adjacent to a display part of a respective one of the plurality of pixels. In some embodiments, the method includes illuminating light onto the plurality of black matrix blocks; and applying a fringe electric field to liquid crystal layers of the N numbers of display panels.

In another aspect, the present disclosure provides a method of fabricating a display apparatus. In some embodiments, the method includes stacking N numbers of display panels together so that the N numbers of display panels are arranged substantially parallel to each other and spaced apart from each other along a depth direction. N is a positive integer greater than 1. In some embodiments, the method further includes forming the N numbers of display panels. Optionally, each of the N numbers of display panels is formed so that each pixel of the N numbers of display panels includes a display part configured to display image and a non-display part where no image is displayed. Optionally, the step of stacking N numbers of display panels is performed in a way so that the N numbers of display panels are configured to display a composite image in a plurality of composite pixels, each of the plurality of composite pixels is a composite pixel of N pixels respectively from the N numbers of display panels, the N pixels spaced apart from each other along the depth direction. Optionally, display parts of the N pixels respectively from the N numbers of display panels are formed to constitute the composite pixel. Optionally, the N numbers of display panels are stacked together so that orthographic projections of the display parts of the N pixels respectively from the N numbers of display panels on a plane substantially parallel to each of the N numbers of display panels are substantially non-overlapping.

In some embodiments, each of the N numbers of display panels is a liquid crystal display panel, and the method further includes forming a black matrix including a plurality of black matrix blocks respectively in a plurality of pixels. Optionally, each individual one of the plurality of black matrix blocks is formed to be directly adjacent to a display part of a respective one of the plurality of pixels. Optionally, each individual one of the plurality of black matrix blocks is formed to divide the display part of the respective one of the plurality of pixels into two sub-parts, and each individual one of the plurality of black matrix blocks is formed to be directly adjacent to the two sub-parts of the respective one of the plurality of pixels.

In some embodiments, the method further includes forming a back light module for providing a back light to the N numbers of display panels. Optionally, the step of forming the back light module includes forming a plurality of light emitting points configured to respectively emit light along a direction toward a plurality of subpixels respectively, e.g., configured to emit light along a direction toward a respective one of the black matrix blocks directly adjacent to a respective one of the plurality of subpixels.

In some embodiments, the black matrix is formed so that the plurality of black matrix blocks formed in a second one of the N numbers of display panels have a width smaller than the plurality of black matrix blocks formed in a first one of the N numbers of display panels. The second one of the N numbers of display panels is formed on a side of the first one of the N numbers of display panels distal to the back light module.

In some embodiments, the step of forming the back light module includes forming a light guide plate having an array of light guide dots on the light guide plate thereby forming the plurality of light emitting points. Optionally, the step of forming the back light module includes forming one or more light sources, forming a light guide plate, and forming a reflective mirror configured to collimate light from the one or more light sources into substantially collimated light. Optionally, the light guide plate is formed to receive the substantially collimated light from one or more lateral sides of the light guide plate, and configured to transmit light to the plurality of subpixels respectively through the plurality of light emitting points respectively.

In some embodiments, the step of stacking N numbers of display panels includes spacing apart the N numbers of display panels from each other so that any two directly adjacent imaging planes of a plurality of imaging planes corresponding to the N numbers of display panels are spaced apart by a substantially same distance. In some embodiments, the step of stacking N numbers of display panels includes spacing apart the N numbers of display panels from each other so that any two directly adjacent virtual imaging planes of a plurality of virtual imaging planes corresponding to the N numbers of display panels are spaced apart by a substantially same distance.

In some embodiments, the method further includes forming a lens between a view zone and the N numbers of display panels.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term"the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising N numbers of display panels substantially parallel to each other and spaced apart from each other along a depth direction, N is a positive integer greater than 1;
wherein the N numbers of display panels are configured to display a composite image in a plurality of composite pixels;
a respective one of the plurality of composite pixels is a composite pixel comprising N display parts respectively from the N numbers of display panels, the N display parts spaced apart from each other along the depth direction;
orthographic projections of the N display parts of the composite pixel respectively from the N numbers of display panels on a plane substantially parallel to the N numbers of display panels are substantially non-overlapping;
a respective one of the N numbers of display panels is a liquid crystal display panel including a black matrix comprising a plurality of black matrix blocks respectively in a plurality of pixels; and
a respective one of the plurality of black matrix blocks is directly adjacent to a display part of a respective one of the plurality of pixels.

2. The display apparatus of claim 1, wherein the respective one of the plurality of black matrix blocks divides the display part of the respective one of the plurality of pixels into two sub-parts;
each individual one of the plurality of black matrix blocks is directly adjacent to the two sub-parts of the respective one of the plurality of pixels;
the respective one of the plurality of black matrix blocks divides a display part of a subpixel in the respective one of the plurality of pixels into two sub-portions; and
the respective one of the plurality of black matrix blocks is directly adjacent to the two sub-portions of the display part of the subpixel in the respective one of the plurality of pixels.

3. The display apparatus of claim 1, further comprising a back light module for providing back light to the N numbers of display panels;
wherein the back light module comprises a plurality of light emitting points configured to respectively emit light along a direction toward a plurality of subpixels respectively.

4. The display apparatus of claim 3, wherein a respective one of the plurality of light emitting points is configured to emit light along a direction toward a respective one of the plurality of black matrix blocks directly adjacent to a respective one of the plurality of subpixels; and
an orthographic projection of the respective one of the plurality of black matrix blocks on a base substrate covers an orthographic projection of the plurality of light emitting points on the base substrate.

5. The display apparatus of claim 3, wherein the plurality of black matrix blocks in a second one of the N numbers of display panels have a width smaller than the plurality of black matrix blocks in a first one of the N numbers of display panels;
wherein the second one of the N numbers of display panels is on a side of the first one of the N numbers of display panels distal to the back light module.

6. The display apparatus of claim 3, wherein the back light module comprises a light guide plate having an array of light guide dots on the light guide plate thereby forming the plurality of light emitting points.

7. The display apparatus of claim 3, wherein the back light module comprises one or more light sources, a light guide plate, and a reflective mirror configured to collimate light from the one or more light sources into substantially collimated light;
wherein the light guide plate is configured to receive the substantially collimated light from one or more lateral sides of the light guide plate, and configured to transmit light to the plurality of subpixels respectively through the plurality of light emitting points respectively.

8. The display apparatus of claim 1, wherein the liquid crystal display panel is a fringe field driven liquid crystal display panel, in which a liquid crystal layer is driven by a fringe electric field.

9. The display apparatus of claim 8, wherein the liquid crystal display panel is one selected from a group consisting of an advanced super-dimensional switching liquid crystal display panel, an in-plane switch liquid crystal display panel, and a fringe field switching liquid crystal display panel.

10. The display apparatus of claim 8, wherein the liquid crystal display panel comprises a common electrode and a pixel electrode;
 wherein the common electrode comprises a plurality of common electrode branches spaced apart from each other; and
 the plurality of common electrode branches have a pitch less than 20 μm.

11. The display apparatus of claim 8, wherein the liquid crystal display panel comprises a common electrode and a pixel electrode;
 wherein the pixel electrode comprises a plurality of pixel electrode branches spaced apart from each other; and
 the plurality of pixel electrode branches have a pitch less than 20 μm.

12. The display apparatus of claim 1, wherein the N numbers of display panels are spaced apart from each other so that any two directly adjacent imaging planes of a plurality of imaging planes corresponding to the N numbers of display panels are spaced apart by a substantially same distance.

13. The display apparatus of claim 1, further comprising a lens.

14. The display apparatus of claim 13, wherein the N numbers of display panels are spaced apart from each other so that any two directly adjacent virtual imaging planes of a plurality of virtual imaging planes corresponding to the N numbers of display panels are spaced apart by a substantially same distance.

15. The display apparatus of claim 1, wherein the display apparatus is free of any polarizer on two sides of the N numbers of display panels and between adjacent display panels of the N numbers of display panels.

16. The display apparatus of claim 1, wherein 2≤N≤28.

17. A method of driving a display apparatus comprising N numbers of display panels substantially parallel to each other and spaced apart from each other along a depth direction, N is a positive integer greater than 1;
 wherein the N numbers of display panels are configured to display a composite image in a plurality of composite pixels;
 a respective one of the plurality of composite pixels is a composite pixel comprising N display parts respectively from the N numbers of display panels, the N display parts spaced apart from each other along the depth direction;
 orthographic projections of the N display parts of the composite pixel respectively from the N numbers of display panels on a plane substantially parallel to the N numbers of display panels are substantially non-overlapping;
 each of the N numbers of display panels is a liquid crystal display panel including a black matrix comprising a plurality of black matrix blocks respectively in a plurality of pixels;
 each individual one of the plurality of black matrix blocks is directly adjacent to a display part of a respective one of the plurality of pixels;
 a respective one of the N numbers of display panels is a liquid crystal display panel including a black matrix comprising a plurality of black matrix blocks respectively in a plurality of pixels; and
 a respective one of the plurality of black matrix blocks is directly adjacent to a display part of a respective one of the plurality of pixels;
 the method comprises:
 illuminating light onto the plurality of black matrix blocks; and
 applying a fringe electric field to liquid crystal layers of the N numbers of display panels.

* * * * *